United States Patent
Hrusch et al.

(10) Patent No.: US 10,788,084 B2
(45) Date of Patent: Sep. 29, 2020

(54) METHOD FOR CONTROLLING ELECTROMAGNETIC WEDGE CLUTCH

(71) Applicant: SCHAEFFLER TECHNOLOGIES AG & CO. KG, Herzogenaurach (DE)

(72) Inventors: Nicholas Hrusch, Wooster, OH (US); Larry Haines, Coshocton, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 135 days.

(21) Appl. No.: 15/825,902

(22) Filed: Nov. 29, 2017

(65) Prior Publication Data

US 2019/0162245 A1 May 30, 2019

(51) Int. Cl.
| | |
|---|---|
| *F16D 27/102* | (2006.01) |
| *F16D 27/14* | (2006.01) |
| *F16D 48/06* | (2006.01) |
| *F16D 15/00* | (2006.01) |
| *F16D 41/063* | (2006.01) |
| *F16D 27/00* | (2006.01) |

(52) U.S. Cl.
CPC .......... *F16D 27/102* (2013.01); *F16D 15/00* (2013.01); *F16D 27/14* (2013.01); *F16D 41/063* (2013.01); *F16D 48/064* (2013.01); *F16D 2027/002* (2013.01)

(58) Field of Classification Search
CPC ......... F16D 2027/002; F16D 2027/001; F16D 27/00; F16D 27/102; F16D 27/14; F16D 48/064; F16D 15/00; F16D 41/063; F16D 13/14

USPC ........................................................ 361/152
See application file for complete search history.

(56) References Cited

U.S. PATENT DOCUMENTS

| | | | |
|---|---|---|---|
| 8,936,143 B2 | 1/2015 | Wagers | |
| 9,115,768 B2 | 8/2015 | Sturgin | |
| 9,644,690 B2 | 5/2017 | Lee | |
| 2008/0078647 A1* | 4/2008 | Watanabe | F16D 41/064 192/41 A |
| 2014/0014455 A1 | 1/2014 | Davis | |
| 2014/0110207 A1 | 4/2014 | Davis | |
| 2015/0014113 A1 | 1/2015 | Ohr et al. | |
| 2015/0027840 A1 | 1/2015 | Lee et al. | |
| 2015/0060223 A1 | 3/2015 | Ohr et al. | |
| 2015/0083539 A1 | 3/2015 | Lee et al. | |
| 2015/0152921 A1 | 6/2015 | Lee | |
| 2015/0152922 A1 | 6/2015 | Lee et al. | |
| 2016/0032988 A1 | 2/2016 | He | |
| 2016/0053828 A1* | 2/2016 | Ookuma | F16D 27/112 192/84.31 |
| 2016/0069400 A1 | 3/2016 | Mordukhovich et al. | |
| 2016/0084326 A1 | 3/2016 | Ramsey | |
| 2016/0138662 A1 | 5/2016 | He | |

(Continued)

OTHER PUBLICATIONS

Lee, Brian, "AWD Disconnect, Escaping the clutches of the dog", Schaeffler Symposium 2014, 27 pages.

(Continued)

*Primary Examiner* — Dharti H Patel
(74) *Attorney, Agent, or Firm* — Brooks Kushman P.C.

(57) ABSTRACT

A transmission control unit for a wedge clutch, comprising a controller configured to send one or more signals to a switch connected to the wedge clutch, the switch being configured to demagnetize the wedge clutch by sending current in a first direction to a coil of the wedge clutch.

10 Claims, 6 Drawing Sheets

(56) References Cited

U.S. PATENT DOCUMENTS

2016/0238090 A1 8/2016 Spencer et al.
2016/0298702 A1 10/2016 He
2016/0341262 A1 11/2016 Ramsey

OTHER PUBLICATIONS

International Search Report and Written Opinion for International Application No. PCT/US2018/016155 dated May 15, 2018, 10 pages.

* cited by examiner

METHOD FOR CONTROLLING ELECTROMAGNETIC WEDGE CLUTCH

TECHNICAL FIELD

The present disclosure relates to controlling a wedge clutch in a motor vehicle.

BACKGROUND

Energizing a wedge clutch system may leave a strong residual magnetic field in the wedge clutch. In such a scenario, the wedge clutch may not return to a one-way clutch (OWC) mode after deenergizing or de-magnetizing. This may result in the wedge clutch to be in a freewheel mode even after it was powered off.

SUMMARY

According to one embodiment, an electric circuit for a wedge clutch includes a clutch coil configured to magnetize or demagnetize based on a direction of current received at the clutch coil, a power relay configured to transfer current to the clutch coil, a controller, and a H-bridge connected to the controller and the wedge clutch coil. The controller is configured to send a first signal configured to send current through the power relay and the H-bridge to the clutch coil in a first direction to magnetize the clutch coil, and send a second signal configured to send current through the power relay and the H-bridge to the clutch coil in a second direction to demagnetize the clutch coil.

According to a second embodiment, a wedge clutch includes an inner race, an outer race, a disk configured to radially expand and contract to selectively lock and unlock the inner race to the outer race, wherein the disk has a first end and a second end that cooperate to define a gap therebetween, and electromagnetic coils integrated into the disk that, when activated, pull the first end toward the second end to constrict the disk and alter the wedge clutch between locked and unlocked, wherein the electromagnetic coils are configured to activate and deactivate in response to a microcontroller configured to generate current to the wedge clutch in a first direction and a second direction.

According to a third embodiment, a transmission control unit for a wedge clutch, comprising a controller configured to send one or more signals to a switch connected to the wedge clutch, the switch being configured to demagnetize the wedge clutch by sending current in a first direction to a coil of the wedge clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
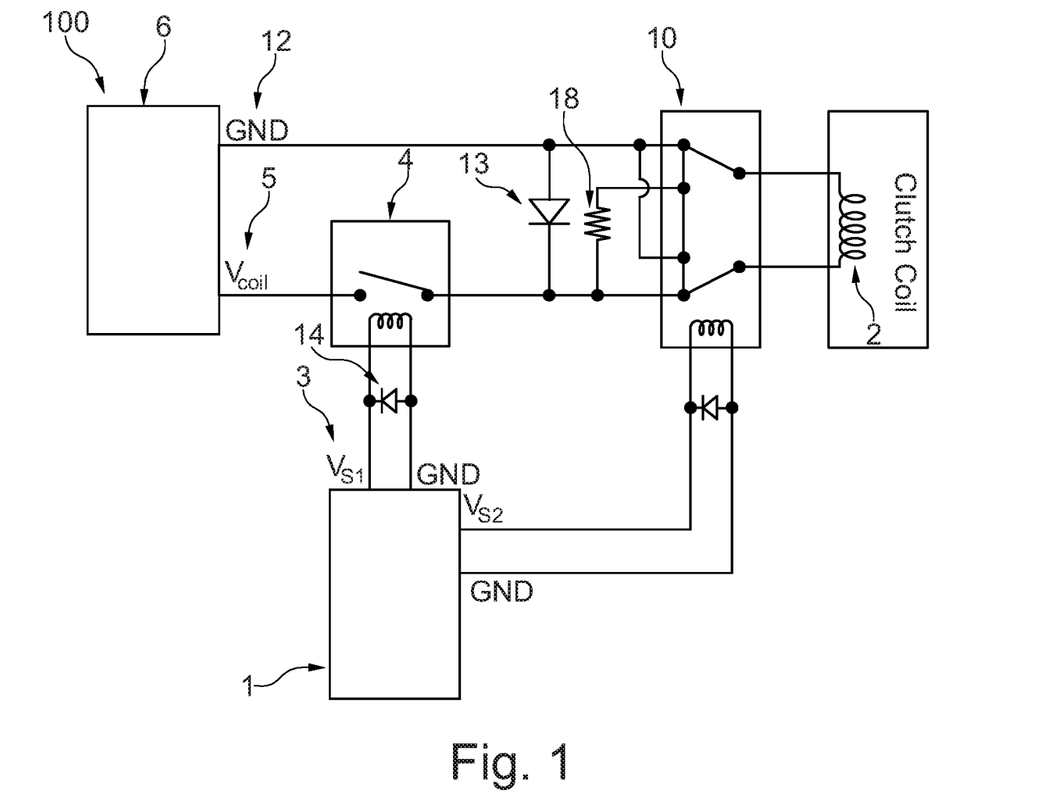
FIG. 1 is an exemplary embodiment of a control circuit in the default state (e.g. OWC mode).

FIG. 1 is an exemplary embodiment of a control circuit in the default state (e.g. OWC Mode). In OWC mode, the relays may not be powered and there may not be a magnetic field. The circuit may be located in a transmission control unit (TCU) or transmission control module that is utilized to control a wedge clutch in an automatic transmission. The TCU may utilize sensors from the vehicle as well as data from the engine control unit (ECU) to operate. The TCU may utilize control signals and/or electric signals to calculate how and when to change gears in a vehicle for optimum performance, fuel economy, shift quality, etc. In certain applications the TCU and ECU may be combined into a single unit that is sometimes referred to as a powertrain control module.

The wedge clutch may need to be magnetized for certain modes. The wedge clutch in a motor vehicle may include two wedge clutches that are parallel with one another. Four modes may be apparent, a lock-lock mode (both wedge clutches are locked), a lock-freewheel mode (first wedge clutch locked while second corresponding wedge clutch is freewheeling), a freewheel-lock mode (first wedge clutch is freewheeling while second corresponding wedge clutch is locked), and a freewheel-freewheel mode (both wedge clutches freewheeling). A wedge clutch can include an inner race connected to an input or output shaft, and an outer race connected to the other of the shafts. A wedge plate can be radially disposed between the inner and outer races and be configured to engage the inner and outer races when the clutch is locked to transmit power from the input shaft to the output shaft.

A wedge clutch may include an inner race, an outer race, and a disk configured to radially expand and contract to selectively lock and unlock the inner race to the outer race. The disk has a first end and a second end that cooperate to define a gap therebetween. Electromagnetic coils (e.g. clutch coil) may be integrated into the disk that, when activated, pull the first end toward the second end to constrict the disk.

A microcontroller 1 may be programmed to control a wedge clutch. The microcontroller 1 may be a transmission control module or any other type of vehicle controller. The microcontroller 1 may send voltage signals or other digital signals to control various components or devices. A power supply 6 may be utilized to provide current to various devices in the vehicle. The power supply 6 may be a standard twelve volt (V) vehicle battery or any other type of battery utilized in a vehicle. The power supply 6 may provide direct current (DC) power to a control circuit.

A relay 4 may be utilized to power a clutch coil 2 when a switch in the relay is turned on. The relay 4 may receive the power from the power supply 6 in order to send a coil voltage signal 6 to the clutch coil 2. As shown in FIG. 1, in OWC mode there is no power that is sent to clutch coil 2, as the switch is open.

A double-pole double-throw (DPDT) relay 10 or H bridge may be utilized in the circuit 100. The H-bridge may utilize the DPDT relay to reverse current to bring the residual magnetic field of the wedge clutch or wedge clutch coil 2 at or to near zero. The H-bridge may utilize any type of switching mechanism in addition to the DPDT relay 10 to facilitate in sending current to the clutch coil 2 in various directions, such as a MOSFET (metal-oxide-semiconductor field-effect transistor) or another type of transistor. The clutch coil 2 may be copper wire (or any other type of conductive metal or electrical conductor) that is potted with a potted compound to maintain integrity of the coil. The H-bridge may include a reverse leg may include a series resistor 18 that may be utilized to reduce the current through the clutch coil 2.

The circuit 100 may also include a first protection diode 13 and second protection diode 14. The first protection diode 13 may be in parallel with the H-bridge. The second protection diode 14 may be in parallel with the power relay 4. As later explained, an intentional delay may be introduced to allow the current generated from the field collapse to be safely dissipated through the power relay 4 and first and second protection diodes 13, 14.

A microcontroller 1 may be programmed to send signals to a circuit in communication with a wedge clutch. The signals may be sent by microcontroller 1 based upon the gear or mode that the wedge clutch is in. A H-bridge may be used to help apply voltage across a load in either direction of the circuit. An H-bridge may be an electronic circuit that helps enable a voltage to be applied across a load in either direction to allow a DC motor to run forward and backward. The H-bridge may be an integrated circuit or a discrete component.

Figure 1A:
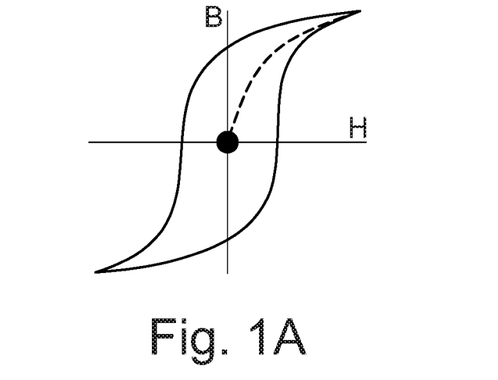
FIG. 1A is an example hysteresis curve of a wedge clutch in OWC mode.

FIG. 1A is an example hysteresis curve of a wedge clutch in OWC mode. In the default OWC mode, the relationship between the magnetic flux density (B) and the magnetizing force (H) may be shown as a hysteresis loop. While the wedge clutch is in OWC mode, the wedge clutch may have no or minimal flux density and magnetizing force.

Figure 2:
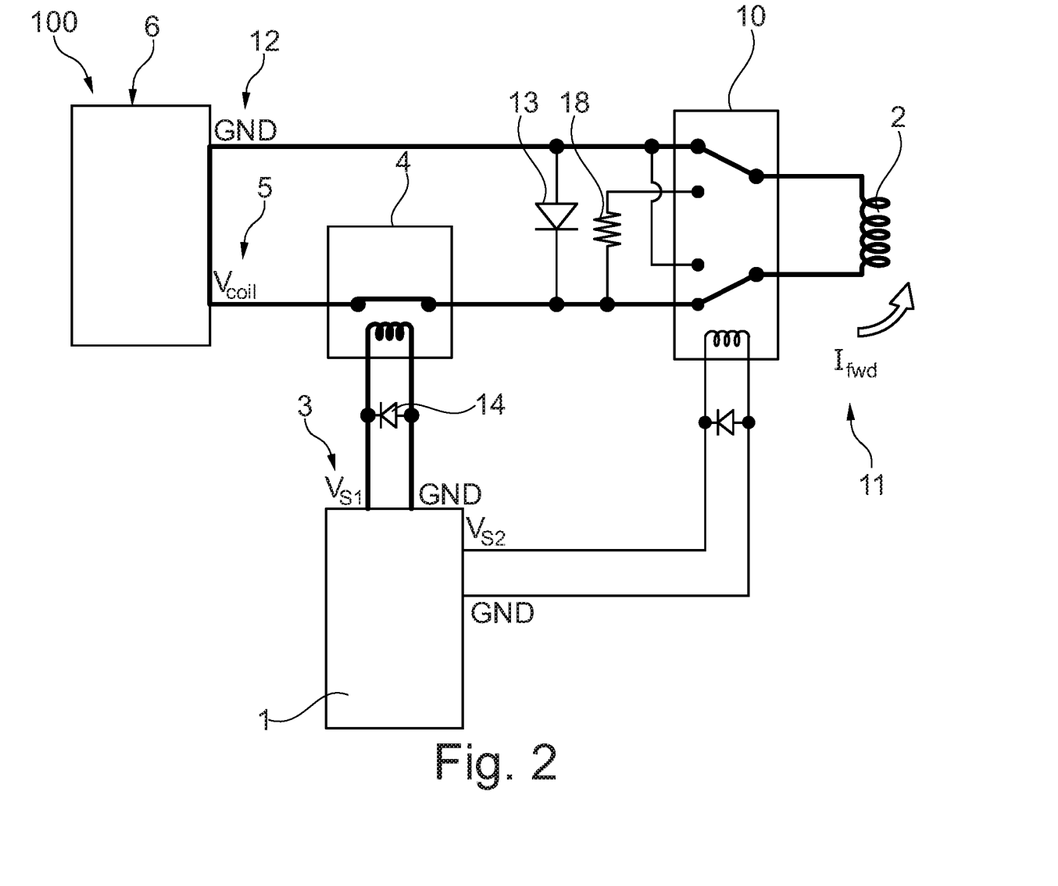
FIG. 2 is an exemplary embodiment of a control circuit with power relay energized (e.g. Freewheel Mode).

FIG. 2 is an exemplary embodiment of a control circuit with power relay energized (e.g. Freewheel Mode). The microcontroller may include a voltage current 3 that is sent through power relay 4. The voltage/current signal 3 may be utilized to activate or deactivate power relay 4. The microcontroller 1 may also be configured to send a second voltage/current signal that is sent to the H bridge relay 10. The second voltage/current signal may be configured to activate the DPDT relay 10, or other type of switch, to allow the H bridge to be configured in a second configuration to allow current to be sent to the clutch coil 2 in a different direction. The microcontroller 1 may control the flow of power to the clutch coil 2 by sending a microcontroller-signal voltage 3 to a power relay 4. The power relay 4 may send DC power with voltage V_coil 5 from a power supply 6 to the clutch coil when freewheel mode is desired (e.g. in a scenario when the vehicle may not want to transfer torque) or achieved. Power relay 4 may be the primary power relay to send current in both a forward configuration and reverse configuration of the H-bridge.

The clutch coil 2 may be placed in the center of an H-bridge configuration. The H-bridge can be built with a (DPDT) relay 10 or other components that allow current to be sent to the clutch coil 2 in different directions. The default, or "forward", leg configuration of the H-bridge sends the current I_fwd 11 required to energize the clutch coil 2 from the power relay 4 through the clutch coil 2 and back to ground 12.

Figure 2A:
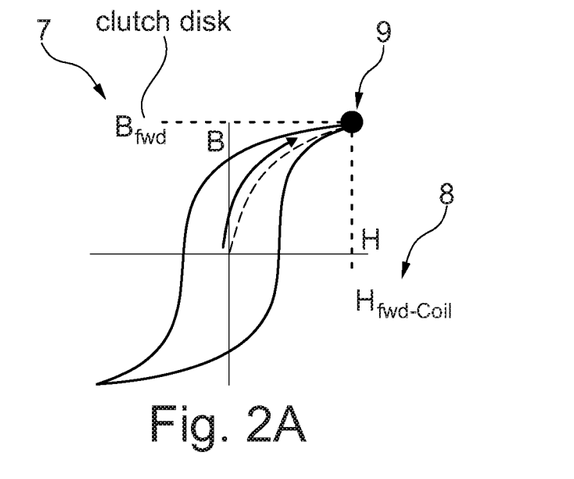
FIG. 2A is an example hysteresis curve of a wedge clutch in freewheel mode.

FIG. 2A is an example hysteresis curve of a wedge clutch in freewheel mode. As shown in FIG. 2A, the field generated by the clutch coil H_fwd 7 induces a magnetic field B_fwd 8 in the wedge clutch. The metal in the wedge clutch is taken up its magnetic hysteresis curve to saturation point (H_fwd, B_fwd) 9. Saturation point 9 may be defined by the force required to freewheel the clutch.

Figure 3:
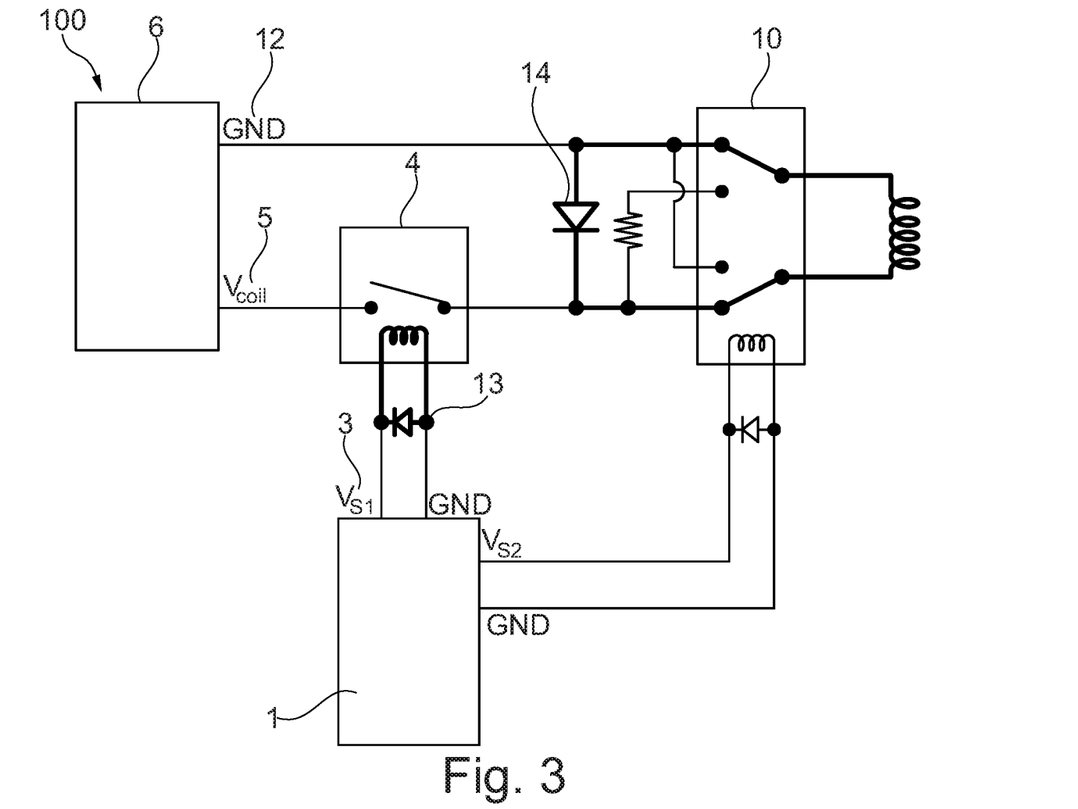
FIG. 3 is an exemplary embodiment of a control circuit while deenergizing a wedge clutch.

FIG. 3 is an exemplary embodiment of a control circuit while deenergizing a wedge clutch. When normal OWC mode is again desired, a number events may occur. First, the microcontroller 1 may turn off the signal to the power relay 4, which may collapse the magnetic field in the clutch coil 2 and in the relay 10. An intentional delay may be introduced to allow the current generated from the field collapse to be safely dissipated through the power relay 4 and to protection diodes 13, 14 as shown in FIG. 3. While power is not sent to the clutch coil 2, the wedge clutch may still have a residual magnetic field that must be addressed to allow the wedge clutch to be in OWC mode again.

Figure 3A:
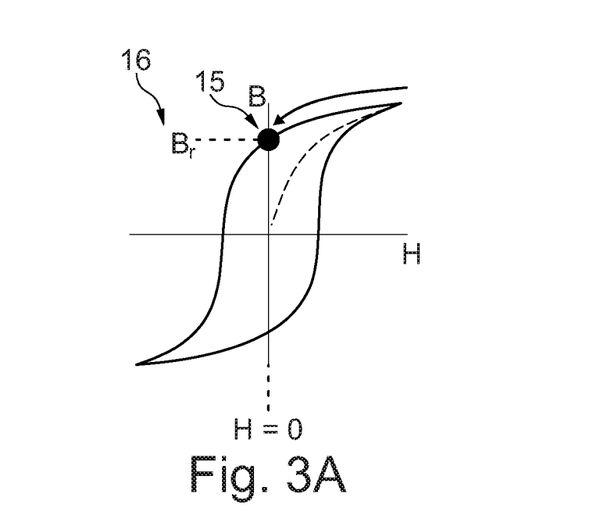
FIG. 3A is an example hysteresis curve of a wedge clutch during deenergizing of a wedge clutch.

FIG. 3A is an example hysteresis curve of a wedge clutch during deenergizing of a wedge clutch. As shown in FIG. 3A, the delay may be based on the inductance of the clutch coil. After the coil energy is dissipated, there is no external field, and the clutch material is at retentivity point (0, B_r) 15 where B_r 16 is the retentivity of the clutch material.

Figure 4:
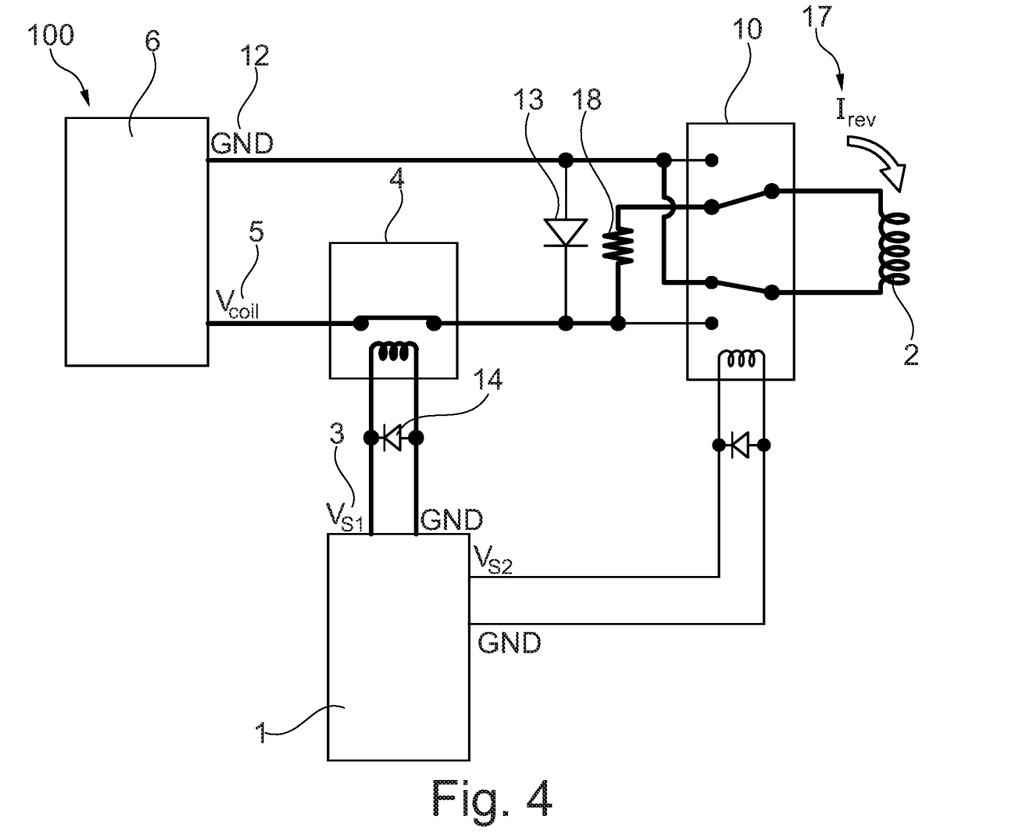
FIG. 4 is an exemplary embodiment of a control circuit with a power relay and H-bridge relay energizing (e.g. demagnetization mode).

FIG. 4 is an exemplary embodiment of a control circuit with a power relay and H-bridge relay energizing the wedge clutch (e.g. demagnetization mode). During a demagnetization mode, the microcontroller 1 may then simultaneously send a voltage signal to both the power relay 4 and the H-bridge using DPDT relay 10. The signals sent to both the power relay 4 and H-bridge may be used to facilitate the wedge clutch being demagnetized, as it may change the configuration of the H-bridge. There may a very short delay while the power relay 4 and the H-bridge relay switch on.

Once both relays (e.g. power relay 4 and DPDT relay 10) are on, the system may be in a demagnetization mode that is configured to demagnetize the wedge clutch. In demagnetization mode, current I_rev 17 may flow through the "reverse" leg of the H-bridge 10. The reverse leg may include a series resistor 18 to reduce the current through the clutch coil 2 such that the wedge plate(s) are demagnetized. The wedge clutch, which was at one time magnetized, may be placed into OWC mode once the it is demagnetized.

Figure 4A:
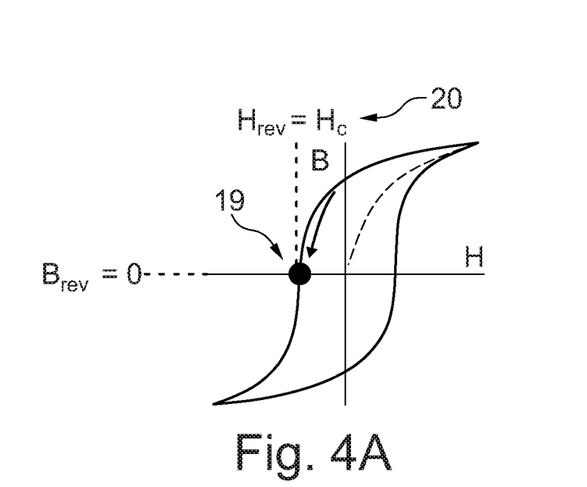
FIG. 4A is an example hysteresis curve of a wedge clutch during a demagnetization mode of a wedge clutch.

FIG. 4A is an example hysteresis curve of a wedge clutch during a demagnetization mode of a wedge clutch. As shown in FIG. 4A, the demagnetization of the wedge clutch may be to a coercivity point (H_c, 0) 19, where H_c 20 is the coercivity of the wedge plate material. The microcontroller 1 may allow the H-bridge 10 in the reverse mode for a time period as long as it takes to fully energize the clutch coil based on an capacity of the coil to absorb a maximum amount of energy, which may be based on the coil inductance. For small coils, the demagnetization cycle will may take less than 0.1 s. The microcontroller 1 may then turn off the signal to both the power relay 4 and the H-bridge relay 10, returning the H-bridge to the forward configuration. The wedge clutch may be in a normal OWC mode upon completion of the demagnetization cycle.

Figure 5:
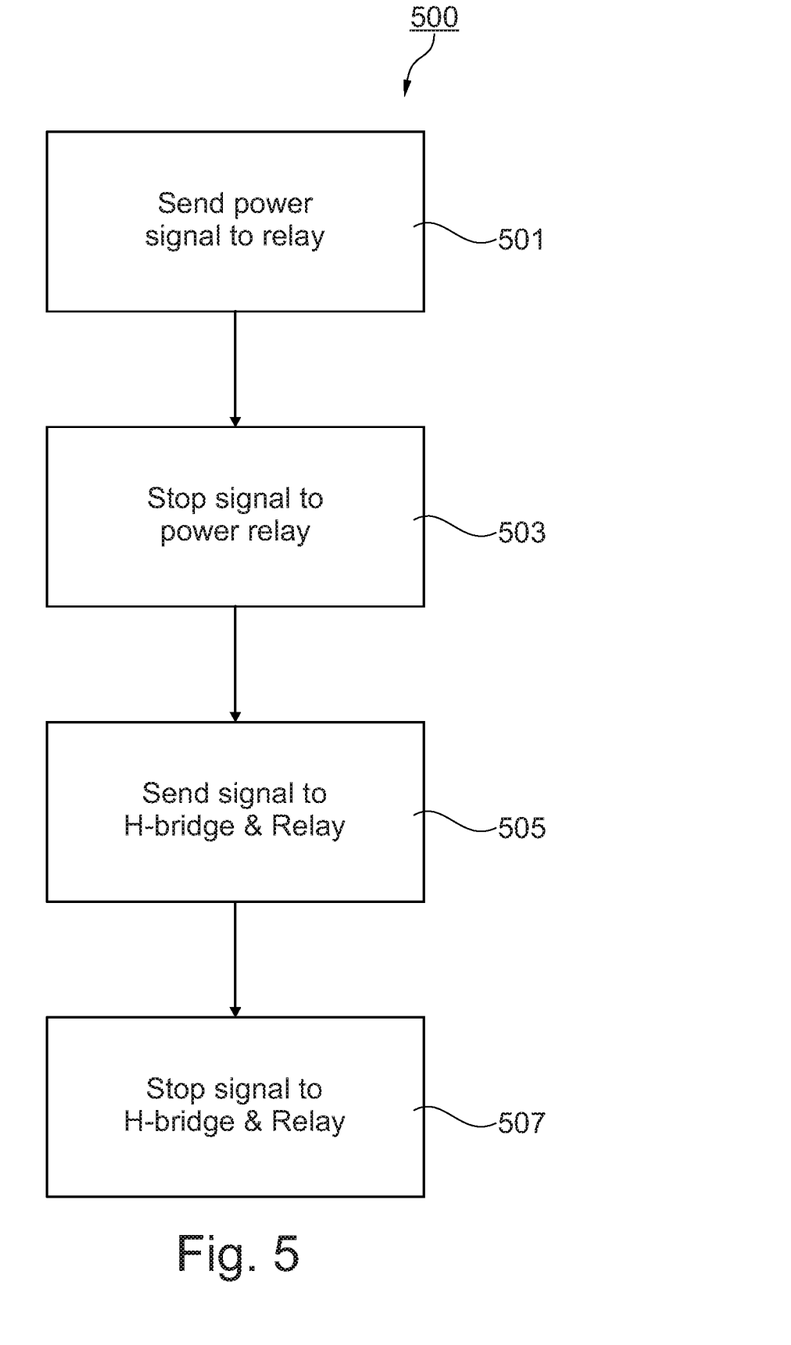
FIG. 5 is an exemplary embodiment of a flowchart of a controller in a transmission control module.

FIG. 5 is an exemplary embodiment of a flowchart 500 of a controller in a transmission control module. The flow chart 500 may be implemented in microcontroller 1, or another controller that is configured to control a wedge clutch. The microcontroller may determine that the wedge clutch is in a default OWC mode (e.g. as shown in FIG. 1). During the OWC mode, the microcontroller may not need to send any signal to begin to demagnetize the wedge clutch. At step 501, the power relay 4 may be activated by a signal from the microcontroller to switch-on and send current from the relay 4 to the wedge clutch utilizing the clutch coil 2.

The wedge clutch may be placed into freewheel mode (e.g. as shown in FIG. 2) because of current flowing from the power relay 4 to the clutch coil 2. The microcontroller 4 may then send a signal at step 503 to the power relay 4 to switch-off and stop sending current to the wedge clutch via the clutch coil 2. The microcontroller 4 may send the signal to The microcontroller 4 may then allow the coil to dissipate at step 505. As such, the microcontroller may simply delay sending any follow-on signal that sends current to the coil in order to allow the coil dissipation delay. By allowing the coil to dissipate any current, the relay 4 may be protected from damage and arching.

Figure 6:
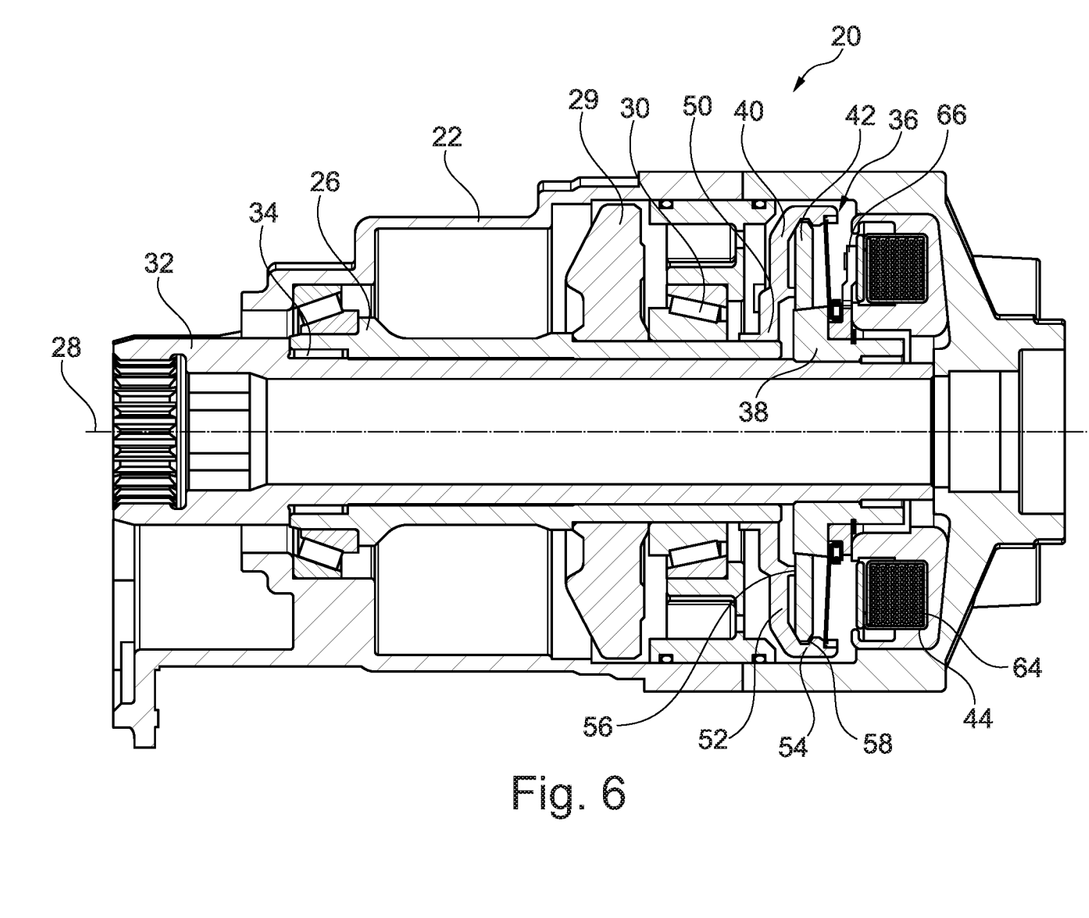
FIG. 6 is a cross-sectional view of a wedge clutch, according to one embodiment.

FIG. 6 is a side cross-sectional view of a power transfer unit having a wedge clutch, according to one embodiment. A wedge clutch 36 is disposed in the housing 22 and selectively couples the input shaft 26 to the output shaft 32 to transfer torque from the input shaft 26 to the output shaft 32. The clutch 36 has a closed state (also referred to as a locked state) in which the input and output shafts are coupled to each other and an open state (also referred to as an unlocked state) in which the input and output shafts are independently rotatable relative to each other.

In the embodiment shown in FIG. 6, the wedge clutch 36 includes a hub 38 (which may be referred to as an inner race), a carrier 40, and a disk 42 (which may be referred to as a wedge plate) that are all supported for rotation about the axis 28. The hub 38 includes an inner surface connected to the output shaft 32 and an outer ramped surface 48. The carrier 40 includes a base 50 connected to the input shaft 26, a radially extending portion 52, and an axially extending portion 54 (which may be referred to as an outer race). A projection 56 extends axially from the radially extending portion 52 and cooperates with the axially extending portion 54 to define a pocket recessed into the carrier 40.

The embodiment in FIG. 6 includes an actuator 44 that moves the clutch between the open and closed states. The actuator 44 may be an electric actuator, as shown, or may be a hydraulic or mechanical actuator. In one embodiment, the electric actuator 44 includes electric coils 64 and an armature 66. The armature 66 is connected to the hub 38 and slides the hub towards the carrier 40 or away from the carrier 40, depending upon an energization state of the coils 64, to operate the clutch. In other embodiments, the actuator is energized to close the clutch and a spring biases the clutch to an open state.

The disclosure above with respect to FIG. 6 is part of U.S. patent application Ser. No. 15/388,270, which is hereby incorporated by reference. Other structural arrangements are contemplated, such as that disclosed in U.S. patent application Ser. No. 15/388,239, which is hereby incorporated by reference, or U.S. patent application Ser. No. 15/456,705, which is also herby incorporated by reference. As can be seen in FIG. 6, the actuator 44, coils 64 and armature 66 require necessary packaging space. According to various embodiments of this disclosure, the disk is modified to include the electromagnetic actuator within the disk itself. This allows the disk to change between the open and closed states from the electromagnetic actuator built into the disk itself.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE SYMBOLS microcontroller 1
clutch coil 2
voltage signal 3
power relay 4
power supply 6
coil voltage signal 7
Hfwd-coil 8
saturation point 9
B_fwd
H-bridge relay 10
current signal 11
ground signal 12
protection diode 13
protection diode 14
retentivity point 15
retentivity of the clutch material 16
resistor 18
coercivity point 19
coercivity of the wedge plate material 20
circuit 100

What is claimed is:

1. An electric circuit for a wedge clutch, comprising:
   a clutch coil configured to magnetize or demagnetize based on a direction of current received at the clutch coil;
   a power relay configured to transfer current to the clutch coil;

a controller; and a H-bridge connected to the controller and the wedge clutch coil, wherein the controller is configured to:
send a first signal configured to send current through the power relay and the H-bridge to the clutch coil in a first direction to magnetize the clutch coil; and
send a second signal configured to send current through the power relay and the H-bridge to the clutch coil in a second direction to demagnetize the clutch coil.

2. The electric circuit of claim 1, wherein the controller is further configured to stop sending current through the power relay and the H-bridge in the second direction upon demagnetization of the wedge clutch.

3. The electric circuit of claim 1, wherein the wedge clutch is energized by the clutch coil in the freewheel mode.

4. The electric circuit of claim 1, where in the controller is further configured to initiate a programmable delay period between sending the first signal and the second signal to allow dissipation of the current from the clutch coil.

5. The electric circuit of claim 1, wherein the H-bridge is configured to utilize a forward configuration that sends current in the first direction from a power supply to the clutch coil.

6. The electric circuit of claim 1, wherein the H-bridge is configured to utilize a backward configuration that sends current to the clutch coil in the second direction.

7. The electric circuit of claim 6, wherein the backward configuration is configured to dissipate a magnetic field of the clutch coil upon the second signal being sent.

8. The electric circuit of claim 7, wherein a diode is connected to the H-bridge and is configured to receive current from the wedge clutch in the backward configuration.

9. The electric circuit of claim 6, wherein the controller is further configured to send a third signal configured to stop sending current through the power relay and the H-bridge in the second direction, causing the H-bridge to return to a forward configuration.

10. The electric circuit of claim 1, wherein the controller is configured to send a third signal upon the clutch coil being fully energized.

* * * * *